Figure 1:
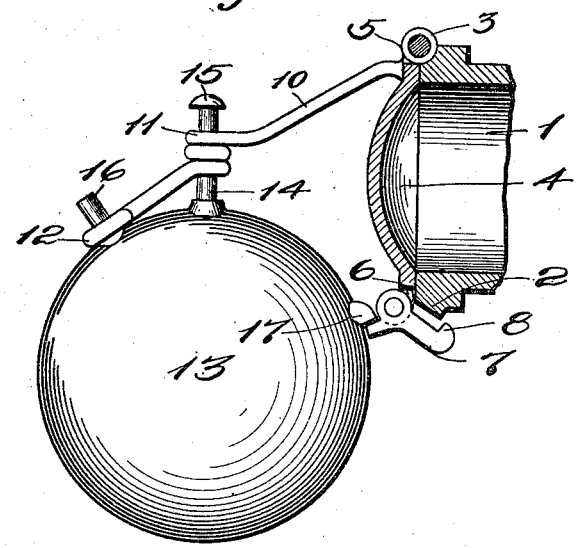

G. E. STROUT.
AUTOMATIC VALVE LOCK.
APPLICATION FILED AUG. 18, 1915.

1,183,692.

Patented May 16, 1916.

Witnesses

Inventor
George E. Strout,
By William W. Deane
his Attorney

UNITED STATES PATENT OFFICE.

GEORGE E. STROUT, OF WALTHAM, MASSACHUSETTS.

AUTOMATIC VALVE-LOCK.

1,183,692.        Specification of Letters Patent.        Patented May 16, 1916.

Substitute for application Serial No. 741,466, filed January 11, 1913. This application filed August 18, 1915. Serial No. 46,118.

*To all whom it may concern:*

Be it known that I, GEORGE E. STROUT, a citizen of the United States, residing at Waltham, in the county of Middlesex and State of Massachusetts, have invented certain new and useful Improvements in Automatic Valve-Locks, of which the following is a specification.

This invention has relation to automatic locks especially adapted to be used in conjunction with the outlet or spigot connections of sewer traps although the lock may be used to advantage when applied to valves used in conjunction with other fittings or fixtures.

The object of the invention is to provide in combination with a swinging float operated valve, means for locking the valve in a closed position which means is adapted to be operated by the float as it rises or falls upon the surface of a liquid to release the said locking means so that the valve is rendered free to swing away from the fitting or fixture to which it is applied.

With the above and other objects in view the structure includes in combination with a fitting as for instance, a spigot connection, a valve pivoted at the upper edge of the said connection and adapted to close against the same. The connection is provided at its lower edge with a keeper, and a gravity latch is pivoted at the lower portion of the valve. An arm is connected with the valve and a float is slidably carried by the arm. This float is provided with a projecting lug which is adapted to engage one end of the latch and swing the same into engagement with the keeper. In other words, the weight of the float moves the latch into locked engagement with the keeper but as soon as the float is lifted off of the latch the said latch swings away from the keeper whereby the lower portion of the valve is released and the same valve is then free to swing away from the spigot connection.

With these and other objects in view, the invention consists in the novel features of construction as hereinafter shown and described, and then particularly pointed out in the claims and in the drawings illustrative of the preferred embodiment of the invention.

Figure 2:
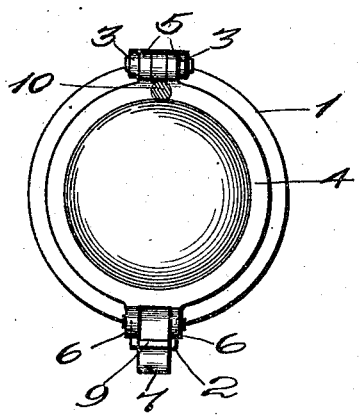

Figure 1 is a side elevation of the lock with parts in section. Fig. 2 is a transverse sectional view of the same.

Corresponding and like parts are referred to in the following description and indicated in all the views of the accompanying drawing by the same reference characters.

As illustrated in the accompanying drawing the spigot connection is indicated at 1. This connection is provided at its lower side with a keeper 2. The spigot 1 is provided at its upper side with ears 3. A valve 4 is provided with gudgeons 5 which are journaled in the ears 3. The said valve 4 is adapted to close against the end of the spigot connection 1 and the intermediate portion of the valve 4 is convexed as clearly illustrated. The valve 4 is provided at the lower portion of its edge with ears 6 and a latch 7 is pivotally connected with the ears 6. The latch is provided with a hook end 8 which is adapted to engage the keeper 2 mounted at the lower side of the spigot connections. The latch 7 is provided at its end opposite the end thereof at which the hook 8 is located with an extension 9 which projects beyond the edges of the ears 6.

An arm 10 is fixed at one end to the valve 4 and as shown is provided at a point between its ends with a coiled section 11, however any other form of opening may be provided at the intermediate portion of the arm 10. The arm 10 is further provided at its free end with an eye 12. A float 13 is used in conjunction with the valve 4 and arm 10. This float may be made of metal or any other suitable material. It is provided at its top with a pin 14 which is loosely received in the coil 11, the said pin having at its upper end a head 15. The pin 14 is adapted to slide with the coil 11 and its sliding movement is limited in one direction by the body of the float 13 and in the opposite direction by the head 15. A pin 16 is carried by the float 13 and is slidably received in the eye 12 and prevents lateral or turning movement of the float 13. A lug 17 is carried by the float 13 and the extension 9 of the latch 7 projects into the path of movement of the said lug 17.

The float 13 is located in the pot or vessel to which the spigot connection 1 is attached. When the level of the liquid in the said vessel is such that the head 15 of the pin 14 is in engagement with the upper end of the coil 11, the lug 17 carried by the float 13 bears against the extension 9 of the latch 7 and holds the hook end 8 of the said latch in engagement with the keeper 2. Therefore the lower portion of the valve 4 is locked in position against the inner end of the spigot connection 1 and no back force or pressure through the said spigot connection can swing the valve 4 to an open position. When however, the level of the liquid in the vessel to which the spigot connection 1 is attached rises to such an extent as to lift the float 13 the lug 17 is moved away from the extension 9 of the latch 7 and the hook end 8 of the said latch falls by gravity away from the keeper 2. Thus the lower portion of the valve 4 is released, and as the float 3 continues to move in an upward direction the arm 10 is swung whereby the lower portion of the valve 4 is swung away from the lower side of the spigot connection 1 and the liquid in the vessel with which the said spigot connection 1 is attached may flow out of the said vessel through the said spigot. As the level of the liquid in the vessel descends the float 13 will fall and the valve 4 will be closed and when the lug 17 engages the extension 9 of the latch 7 the hook 8 of the said latch is swung into engagement with the keeper 2 and the valve 4 is thus held in a locked position against the end of the spigot connection 1. Therefore it will be seen that a simple and an effective means adapted to be automatically operated by the rise and fall of a liquid is provided for locking a valve in closed position at the end of a spigot or other connection.

Having described the invention what is claimed, is:—

1. In combination with a pipe connection, a keeper fixed to the connection, a valve pivoted to the connection, a float connected to the valve, a lock pivoted to the valve and adapted to engage the keeper, means carried by the float for engaging the lock with the keeper.

2. In combination with a pipe connection having a keeper, a valve pivoted to the connection, a latch pivoted to the valve, an arm fixed to the valve, a float carried by the arm and adapted to move with relation to the arm, and a lug carried by the float and adapted to engage the latch.

3. In combination with a pipe connection having a keeper, a valve pivoted to the pipe connection, a latch pivoted to the valve and adapted to engage the keeper, an arm fixed to the valve and having at a point between its ends an opening and at its end an eye, a float having pins which are slidably received in the opening and eye of the arm and a lug carried by the float and engageable with the latch.

4. In combination with a pipe connection having a keeper, a valve pivoted to the pipe connection, a latch pivoted to the valve and adapted to engage the keeper, an arm fixed to the valve, a float carried by the arm and adapted to have limited movement with relation to the arm and a lug carried by the float and engageable with the latch.

5. In combination with a pipe connection, having a keeper, a valve pivoted to the pipe connection, a latch adapted to engage the keeper, an arm fixed to the valve, a float slidably mounted upon the arm, means for holding the float against rotation and a lug carried by the float and engageable with the latch.

In testimony whereof I affix my signature in presence of two witnesses.

GEORGE E. STROUT.

Witnesses:
MARTHA M. PHILBRICK,
ROBERT M. STARK.

Copies of this patent may be obtained for five cents each, by addressing the "Commissioner of Patents, Washington, D. C."